United States Patent
Kushwah

(10) Patent No.: US 8,463,748 B1
(45) Date of Patent: Jun. 11, 2013

(54) FILE SYSTEM QUIESCING

(75) Inventor: Ajay Pratap Singh Kushwah, San Ramon, CA (US)

(73) Assignee: EMC Corporation, Hopkinton, MA (US)

( * ) Notice: Subject to any disclaimer, the term of this patent is extended or adjusted under 35 U.S.C. 154(b) by 496 days.

(21) Appl. No.: 10/853,014

(22) Filed: May 24, 2004

Related U.S. Application Data

(60) Provisional application No. 60/542,316, filed on Feb. 5, 2004.

(51) Int. Cl.
*G06F 7/00* (2006.01)
*G06F 17/00* (2006.01)

(52) U.S. Cl.
USPC .................. 707/648; 707/653; 707/654

(58) Field of Classification Search
USPC .................. 707/100, 640, 648, 653
See application file for complete search history.

(56) References Cited

U.S. PATENT DOCUMENTS

| | | | | |
|---|---|---|---|---|
| 5,546,534 | A * | 8/1996 | Malcolm | 714/6 |
| 5,623,666 | A * | 4/1997 | Pike et al. | 707/200 |
| 6,763,442 | B2 * | 7/2004 | Arakawa et al. | 711/165 |
| 6,842,770 | B1 * | 1/2005 | Serlet et al. | 709/203 |
| 2002/0083037 | A1* | 6/2002 | Lewis et al. | 707/1 |
| 2004/0098394 | A1* | 5/2004 | Merritt et al. | 707/100 |
| 2005/0081099 | A1* | 4/2005 | Chang et al. | 714/15 |

OTHER PUBLICATIONS

"Virtual File System Part 1", Mar. 22, 2001, FreeOS.com, http://www.freeos.com/articles/3838/.*
"JFS and JFS2 functions" http://publib.boulder.ibm.com/infocenter/pseries/v5r3/index.jsp?topic=/com.ibm.aix.baseadmn/doc/baseadmndita/fs_jfs_jfs2.htm.*

* cited by examiner

*Primary Examiner* — Mariela Reyes
(74) *Attorney, Agent, or Firm* — Van Pelt, Yi & James LLP

(57) ABSTRACT

Techniques are disclosed for quiescing a file system. One technique comprises freezing a file system, flushing a memory associated with the file system, and thawing the file system. One technique comprises receiving a request targeted to a file system and intercepting the request.

23 Claims, 8 Drawing Sheets

)
FILE SYSTEM QUIESCING

CROSS REFERENCE TO RELATED APPLICATIONS

This application claims priority to U.S. Provisional Patent Application No. 60/542,316 entitled FILE SYSTEM QUIESCING DRIVER filed Feb. 5, 2004 which is incorporated herein by reference for all purposes.

FIELD OF THE INVENTION

The present invention relates generally to computer environments. More specifically, file system quiescing is disclosed.

BACKGROUND OF THE INVENTION

Data protection plays an increasingly important role in today's computer systems. Data protection often involves regular backups of data. Data may be backed up in various ways, such as by creating a snapshot of a disk to back up a file system. A snapshot may include a backup copy of data as it appeared at a certain point in time. Typically, a portion of disk data is stored in a separate memory associated with the disk, such as in in-core file system buffers. Before creating a snapshot of a disk, any data held in that associated memory typically needs to be flushed to the disk so that a consistent snapshot of the disk can be taken.

There are various methods that may be used to backup inconsistent disk data. For example, a snapshot may be created of the inconsistent data, followed by the execution of a utility that can make the snapshot consistent, such as fsck in UNIX or chkdsk in Windows. However, this can be time consuming when backing up a large file system. A file system can be unmounted, but this would require closing applications and disrupting the user, which may be unacceptable. There are file systems that provide a facility to flush the associated memory to disk while somehow preventing system I/O from altering the disk image of that file system. However, these are internal to the file system and typically cannot be used with other file systems. It would be desirable to have a system that can efficiently make a disk consistent for file system backup or other applications.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

In one embodiment, a consistent disk image of a file system may be created by quiescing the file system. I/O requests targeted to the file system may be intercepted to prevent altering the disk image of the file system.

Figure 1:
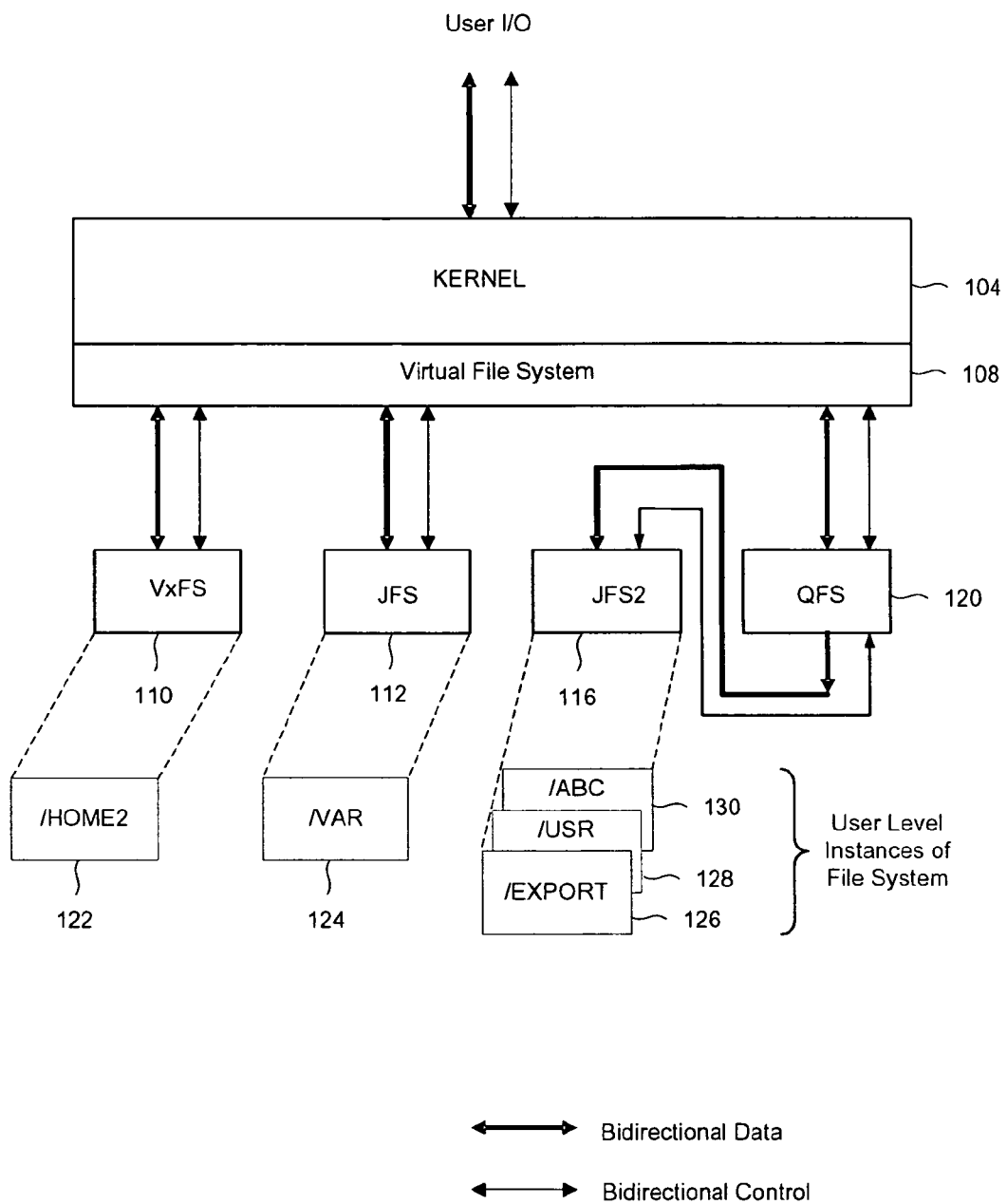
FIG. 1 is a block diagram of a technique used in one embodiment to quiesce a file system.

FIG. 1 is a block diagram of a technique used in one embodiment to quiesce a file system. Quiescing, as used herein, includes making a file system or disk consistent, for example, by freezing and flushing the file system. The file system may then be thawed in this example. In this example, a JFS2 file system is quiesced. A user is shown to interact with a kernel 104 to request an I/O operation. Kernel 104 is shown to interact with Virtual File System 108 (VFS), which provides an interface for interacting with various types of file systems, such as Veritas File System (VxFS) 110, IBM Journaling File System (JFS) 112, IBM Enhanced Journaling File System (JFS2) 116, and quiescing file system (QFS) 120. Kernel 104 may interact with any appropriate file system, such as VXFS or native AIX file systems. File system instances 122 and 124 are examples of user level instances of their VxFS 110 and JFS 112. Likewise, file system instances 126-130 are examples of user level instances of JFS2 116. I/O requests targeted at file systems 110, 112, and 116 are shown to pass directly to their respective file systems. I/O requests targeted at JFS2 116 are intercepted by QFS 120. When any instance of JFS2 116 (such as file system instance 128) is frozen, QFS 120 prevents the JFS2 file system disk image for that file system instance from being altered while the file system is flushed. Further details of QFS 120, freezing, and flushing will later be discussed in conjunction with the remaining figures.

Figure 2:
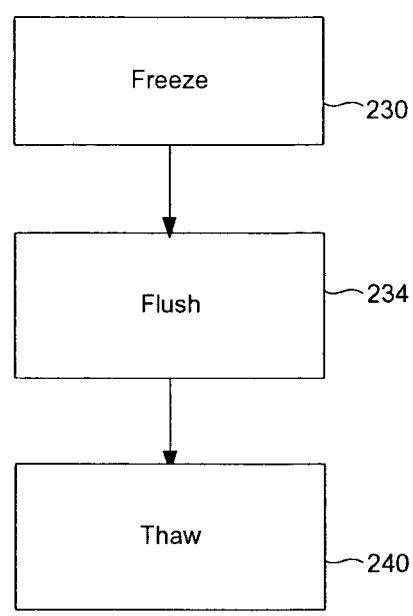
FIG. 2 is a flowchart illustrating a technique used in one embodiment to quiesce a file system.

FIG. 2 is a flowchart illustrating a technique used in one embodiment to quiesce a file system. In this example, a file system, such as one of file system instances 126-130 of FIG. 1, is frozen (230). Freezing may include any action that prevents altering the disk image of the file system, such as configuring the system so that any incoming I/O requests are intercepted. Once frozen, the file system is flushed (234). Memory associated with the file system, such as in-core memory, disk cache, or file system buffers, is flushed to the disk. Flushing includes pushing data in memory to the disk so that the disk image is consistent. Once the file system is flushed, a snapshot of the disk is created. The file system is then thawed (240). Thawing may include returning the system to its original state. For example, incoming I/O requests that were intercepted while the file system was frozen now resume.

Figure 3A:
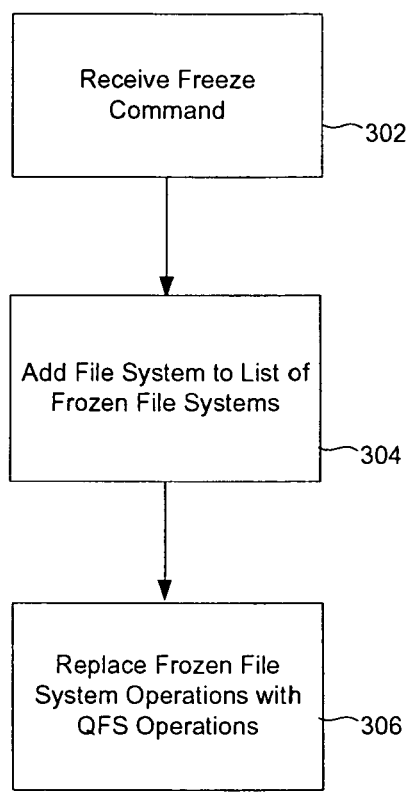
FIG. 3A is a flowchart illustrating a technique used in one embodiment to freeze a file system.

FIG. 3A is a flowchart illustrating a technique used in one embodiment to freeze a file system (230). In this example, a freeze command is received (302). For example, a freeze command may be received from a user via a snapshot program. The file system to be frozen is added to a list of frozen file systems (304). Operations associated with the file systems to be frozen are replaced with QFS operations (306). An example of replacing an operation with a QFS operation is shown in FIG. 3B.

Figure 3B:
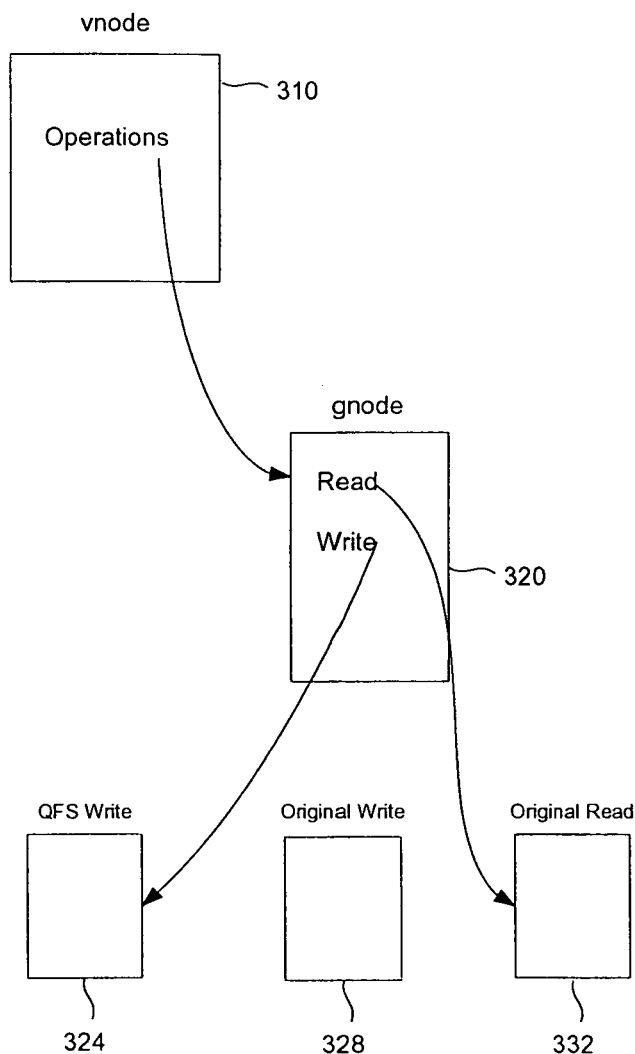
FIG. 3B is a block diagram illustrating an example of a write operation that has been replaced by a QFS write operation in one embodiment.

FIG. 3B is a block diagram illustrating an example of a write operation that has been replaced by a QFS write operation (306) in one embodiment. In this example, a vnode 310 is shown. A vnode, as used herein, is an internal representation of a file or directory. A vnode is associated with each active file. In this example, vnode 310 is shown to include an operations pointer that points to gnode 320. A gnode, as used herein, includes a list of operations for a file system, such as GN_OPS_TABLE in the JFS2 file system. The list may be shared by multiple instances of a file system. Each operation within gnode 320 points to a function for that operation. For example, the read operation within gnode 320 is shown to point to read function 332. The write operation within gnode 320 is shown to point to QFS write function 324. The write operation within gnode 320 originally pointed to original write function 328, but has been redirected to point to QFS write function 324. If a write operation directed at this file system is received, QFS write function 324 is executed, rather than the original write function 328.

QFS write function 324 may include instructions to hold the write operation while the file system is frozen. For example, an operation may be held by sleeping on an event. In some embodiments, the read operation within gnode 320 is similarly redirected. Any appropriate operation may be redirected, such as any operation that may change the contents of the disk. Because changing the contents of the disk can make the disk inconsistent, in some embodiments, all change operations are redirected. Change operations, as used herein, include any operation that can alter the disk image of the file system. For example, a change operation may include a write operation. Examples of change operations include creating a new file, opening a new file for writing, and changing directory permissions.

In some embodiments, after receiving the freeze command (302), it is determined whether any file systems of the same type are already frozen. If there are other file systems of that type, it is assumed that the file system operations have already been replaced with QFS operations. For example, if the file system to be frozen is a JFS2 file system, the list of frozen file systems is consulted to determine if there are any other frozen JFS2 file systems. If there are other frozen JFS2 file systems, the operations within the JFS2 gnode may already have been replaced. As such, replacing these operations (306) may be unnecessary.

Figure 3C:
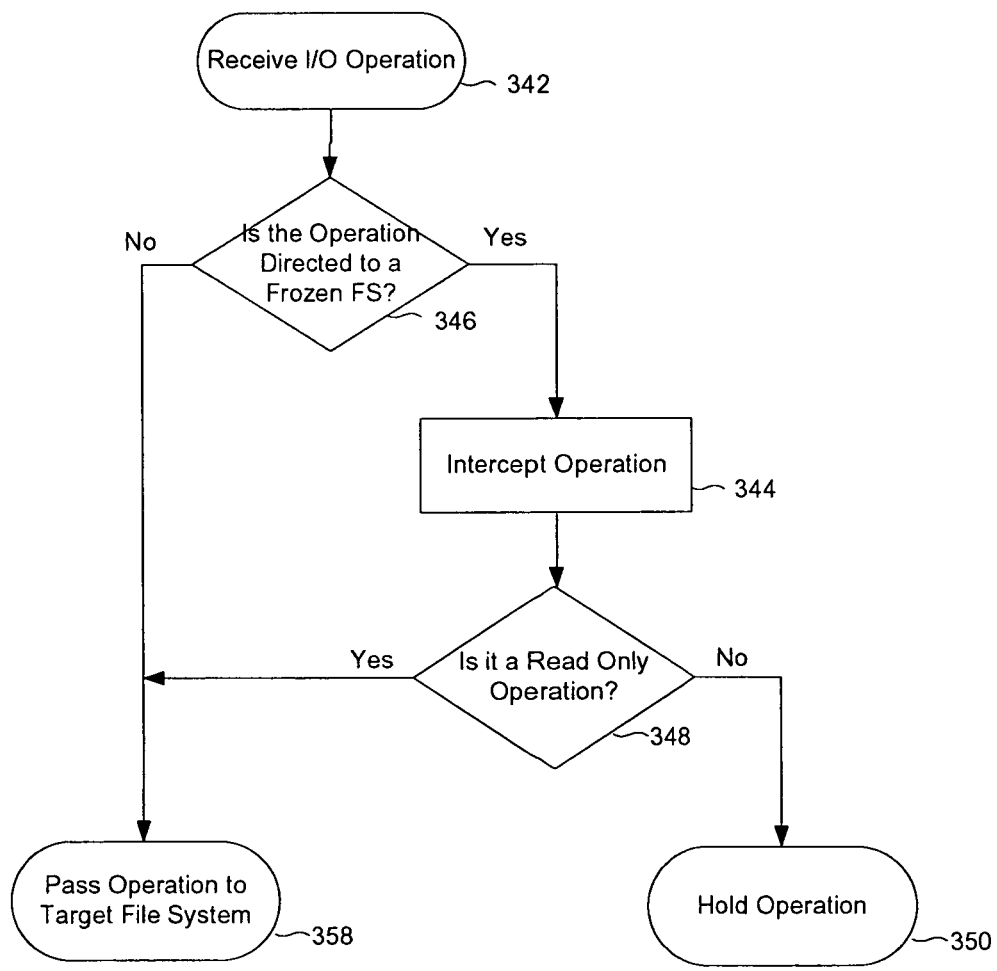
FIG. 3C is a flowchart illustrating a technique used in one embodiment to handle an I/O request.

In some embodiments, once a file system is frozen, I/O requests directed at that file system may be handled as shown in FIG. 3C. FIG. 3C is a flowchart illustrating a technique used in one embodiment to handle an I/O request. In this example, an I/O operation is received (342). For example, a read or write request is received. It is determined whether the operation is directed to a frozen file system (346). For example, a list of currently frozen file systems may be consulted. If the operation is not directed to a frozen file system, the operation is passed to the target file system (358). For example, in FIG. 1A, VxFS 110 is not frozen. I/O operations are sent from VFS 108 to VxFS 110. If the operation is directed to a frozen file system, the operation is intercepted (344). For example, in FIG. 1A, JFS2 116 is frozen. I/O operations sent from VFS 108 to JFS2 116 are intercepted by QFS 120. It is determined whether the operation is a read only operation (348). Read only operations include operations that do not alter the disk image of the file system. If the operation is a read only operation, the operation is passed to the target file system (358). If the operation is not a read only operation, the operation is held (350). For example, all write operations may be replaced with QFS operations that each include a hold instruction, as shown in FIG. 3B. In some embodiments, all operations are held, so determining whether the operation is a read only operation (348) is optional.

Figure 4:
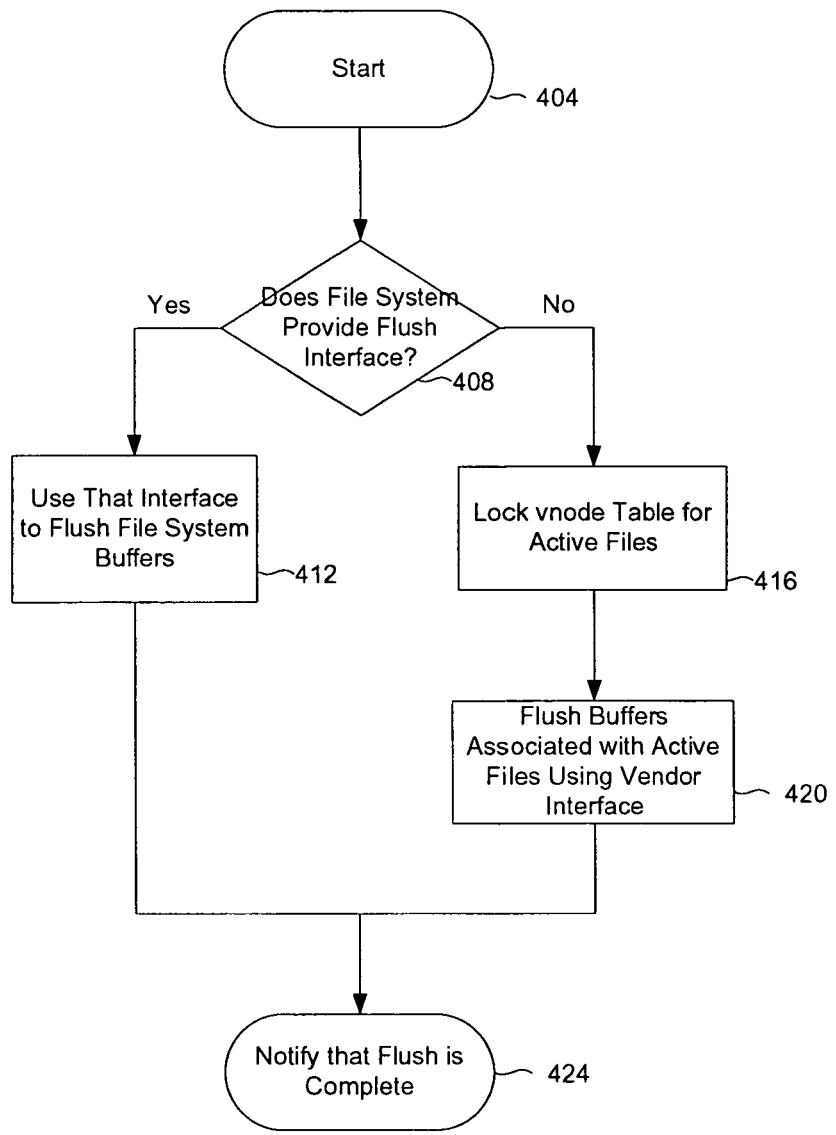
FIG. 4 is a flowchart illustrating a technique used in one embodiment to flush a file system.

FIG. 4 is a flowchart illustrating a technique used in one embodiment to flush a file system (234). Once a file system is frozen and new write operations to the file system are held, memory associated with the file system is flushed in this example. In this example, it is determined whether the file system provides a flush interface (408). Some file systems, such as JFS2, may provide an interface for flushing the associated memory, while others, such as JFS, do not. If the file system provides a flush interface, that flush interface is used to flush the file system associated memory (412). For example, fscntl interface FSCNTL_QSFS may be used in JFS2 on AIX 5.2. If the file system does not provide an interface for flushing the associated memory, the file system can be flushed by flushing each vnode. An interface for flushing a vnode is provided in the vfs layer by the file system. For example, vn_fsync_range( ) is provided on AIX 5.2 by various file systems in the vfs layer. Vnode tables associated with active files are locked (416) so that the tables cannot be grown. Memory associated with each vnode is flushed (420). For example, each active vnode may be flushed one by one. A notification that the flush is complete is provided (424). The vnode table associated with the active files may then be unlocked. At this point, a snapshot of the clean file system image may be created using a snapshot application.

Figure 5:
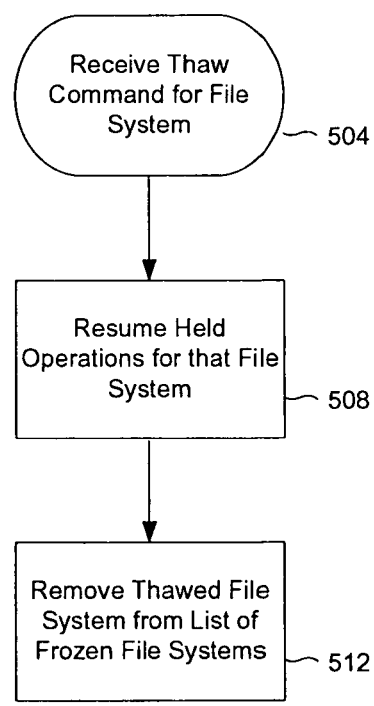
FIG. 5 is a flowchart illustrating a technique used in one embodiment to thaw a file system.

FIG. 5 is a flowchart illustrating a technique used in one embodiment to thaw a file system (240). Once a file system is flushed, the file system is thawed so that held operations may be resumed in this example. In this example, a thaw command for the file system is received (504). For example, a thaw command may be received from a user or a program after a successful snapshot or when a file system freeze times out, as described below. Operations that were held for that file system while the file system was frozen are resumed (508). For example, if a write operation was held while the file system was frozen, the write operation resumes. The QFS write function shown in FIG. 3B may include a hold instruction that holds the write function. When a thaw command is received, the hold is released and the write function resumes. In some embodiments, when the hold is released, the original write function is called. The file system is removed from a list of frozen file systems (512). Accordingly, I/O requests targeted at the file system are no longer intercepted.

Optionally, the list of frozen file systems may be consulted and if there are no more frozen file systems of that type, any operations that were replaced for that file system type may now be returned. For example, if a write operation pointer was redirected to a QFS write function during the freeze process, the pointer may be redirected back to the original write function.

Figure 6:
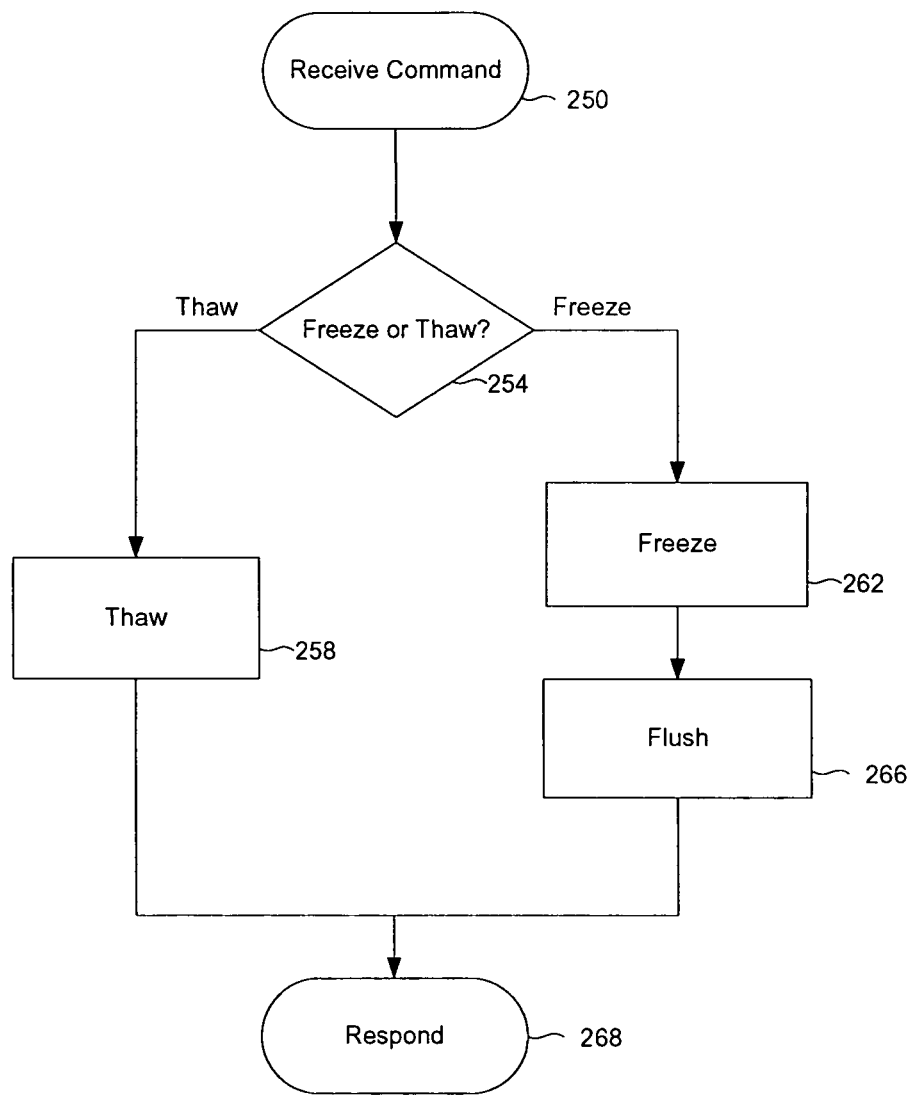
FIG. 6 is a flowchart illustrating a technique used in one embodiment for quiescing a file system based on received commands.

In some embodiments, the process of quiescing a file system is controlled by received commands. FIG. 6 is a flowchart illustrating a technique used in one embodiment for quiescing a file system based on received commands. In this example, a command is received (250). It is determined whether the command is to freeze or to thaw the file system (254). For example, if the file system is currently frozen, the command may be to thaw the file system. If the command is to freeze the file system, the file system is frozen (262) and flushed (266). If the command is to thaw the file system, the file system is thawed (258). A response is provided (268), such as an indication that a flush was successful.

In some embodiments, a time out timer may be configured to time out a freeze when appropriate. For example, if a snapshot encounters problems and cannot be completed within a certain time, the freeze may time out and the file system may thaw. For example, a thaw command may be sent. Including a time out timer may be desirable as a safety feature to ensure that the system does not remain frozen for an excessive amount of time. In one embodiment, the time out timer registers with the system timer when the file system freezes, and unregisters with the system timer when the file system thaws. When a time out occurs, the time out event may be noted in the list of frozen file systems or recorded in other ways.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of quiescing a file system, comprising:
freezing a file system, comprising:
redirecting an operation function pointer from pointing to an original first function associated with the file system to a second function not associated with the file system, wherein in response to a file system operation being requested, the second function is executed and the first function is not executed while the second function is executed, and wherein the operation function pointer corresponds to the file system and stores a pointer pointing to a function call corresponding to the requested file system operation, and wherein the second function includes instructions for holding the execution of the requested file system operation while the file system is frozen, and wherein holding includes keeping any data intended to be written to the file system by the requested file system operation from being written to any storage;
flushing a memory associated with the file system;
taking a snapshot of the file system after flushing the memory; and
thawing the file system after taking the snapshot;
wherein thawing the file system includes releasing the holding of the execution of the requested file system operation and resuming the execution of the requested file system operation, and wherein freezing includes adding the file system to a list of frozen file systems, and in the event that the list of frozen file systems includes more than one file system, the redirecting of the operation function pointer is not performed.

2. The method of claim 1, wherein the file system is a UNIX, AIX, JFS2, or JFS file system.

3. The method of claim 1, wherein the memory associated with the file system is in-core memory.

4. The method of claim 1, wherein the file system operation is a write operation or a change operation.

5. The method of claim 1, wherein flushing includes using a file system provided interface to flush the file system or a vnode.

6. The method of claim 1, wherein thawing includes removing the file system from a list of frozen file systems.

7. The method as recited in claim 1, wherein the file system is associated with a gnode that includes the operation function pointer.

8. The method as recited in claim 1, wherein redirecting includes hooking the first function.

9. The method as recited in claim 1, wherein the second function is associated with a quiescing file system that is above the file system.

10. The method as recited in claim 1, wherein thawing includes redirecting the operation function pointer from the second function to the first function.

11. The method as recited in claim 1, wherein the operation function pointer is one of a plurality of operation function pointers that may be redirected while the file system is frozen, and wherein each of the plurality of operation function pointers corresponds to a different file system operation.

12. The method as recited in claim 1, wherein a portion of the plurality of operation function pointers are redirected and a remaining portion of the plurality of operation function pointers are not redirected.

13. The method as recited in claim 1, wherein the remaining portion of the plurality of operation function pointers includes an operation function pointer corresponding to a read operation.

14. A system for quiescing a file system, comprising:
a processor configured to:
freeze a file system, wherein freezing comprises:
redirecting an operation function pointer from pointing to an original first function associated with the file system to a second function not associated with the file system, wherein in response to a file system operation being requested, the second function is executed and the first function is not executed while the second function is executed, and wherein the operation function pointer corresponds to the file system and stores a pointer pointing to a function call corresponding to the requested file system operation, and wherein the second function includes instructions for holding the execution of the requested file system operation while the file system is frozen, and wherein holding includes keeping any data intended to be written to the file system by the requested file system operation from being written to any storage;
flush a memory associated with the file system;
take a snapshot of the file system after the memory is flushed; and
thaw the file system after the snapshot is taken; and
a memory coupled with the processor, wherein the memory provides the processor with instructions;
wherein thawing the file system includes releasing the holding of the execution of the requested file system operation and resuming the execution of the requested file system operation, and wherein freezing includes adding the file system to a list of frozen file systems, and in the event that the list of frozen file systems includes more than one file system, the redirecting of the operation function pointer is not performed.

15. The system of claim 14, wherein the file system operation is a write operation or a change operation.

16. The system of claim 14, wherein flushing includes using a file system provided interface to flush the file system or a vnode.

17. The system of claim 14, wherein thawing includes removing the file system from a list of frozen file systems.

18. The system as recited in claim 14, wherein the file system is associated with a gnode that includes the operation function pointer.

19. The system as recited in claim 14, wherein thawing includes redirecting the operation function pointer from the second function to the first function.

20. The system as recited in claim 14, wherein the operation function pointer is one of a plurality of operation function pointers that may be redirected while the file system is frozen, and wherein each of the plurality of operation function pointers corresponds to a different file system operation.

21. The system as recited in claim 14, wherein a portion of the plurality of operation function pointers are redirected and a remaining portion of the plurality of operation function pointers are not redirected.

22. The system as recited in claim 14, wherein the remaining portion of the plurality of operation function pointers includes an operation function pointer corresponding to a read operation.

23. A computer program product for quiescing a file system, the computer program product being embodied in a non-transitory computer readable medium and comprising computer instructions for:

freezing a file system, comprising:
  redirecting an operation function pointer from pointing to an original first function associated with the file system to a second function not associated with the file system, wherein in response to a file system operation being requested, the second function is executed and the first function is not executed while the second function is executed, and wherein the operation function pointer corresponds to the file system and stores a pointer pointing to a function call corresponding to the requested file system operation, and wherein the second function includes instructions for holding the execution of the requested file system operation while the file system is frozen, and wherein holding includes keeping any data intended to be written to the file system by the requested file system operation from being written to any storage;
flushing a memory associated with the file system;
taking a snapshot of the file system after flushing the memory; and
thawing the file system after taking the snapshot;
wherein thawing the file system includes releasing the holding of the execution of the requested file system operation and resuming the execution of the requested file system operation, and wherein freezing includes adding the file system to a list of frozen file systems, and in the event that the list of frozen file systems includes more than one file system, the redirecting of the operation function pointer is not performed.

* * * * *